(12) United States Patent
Shimizu et al.

(10) Patent No.: US 6,422,095 B1
(45) Date of Patent: Jul. 23, 2002

(54) MAGNETOSTRICTIVE TORQUE SENSOR AND ELECTRIC POWER STEERING APPARATUS INCLUDING THE SAME

(75) Inventors: Yasuo Shimizu; Yasuharu Ohyama; Katsuji Watanabe; Shigeru Yamawaki; Atsuhiko Yoneda; Yasuhiro Terada, all of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/696,653

(22) Filed: Oct. 25, 2000

(30) Foreign Application Priority Data

Nov. 1, 1999 (JP) .......................................... 11-311514

(51) Int. Cl.[7] .............................................. G01L 3/02
(52) U.S. Cl. ............................................... 73/862.335
(58) Field of Search .......................... 774/779, 862.331, 774/862.332, 862.333, 862.335

(56) References Cited

U.S. PATENT DOCUMENTS 3,861,206 A * 1/1975 Kawafune et al. ............ 72/141
4,627,298 A * 12/1986 Sahashi et al. ........... 73/862.36
5,280,729 A * 1/1994 Aoki et al. ............ 73/862.333
5,589,645 A * 12/1996 Kobayashi et al. ..... 73/862.335

FOREIGN PATENT DOCUMENTS

JP 6-221940 8/1994
JP 9-166505 12/1995

* cited by examiner

Primary Examiner—Max Noori
(74) Attorney, Agent, or Firm—Merchant & Gould, P.C (57) ABSTRACT

A magnetostrictive torque sensor includes a magnetostrictive film of width W provided along a circumference of a rotational shaft. The film causes magnetostriction in correspondence to a torque applied to the rotational shaft. The torque sensor also includes excitation and detection cores each having substantially U-shaped configuration. These cores are disposed in opposed relation to the film. The excitation core extends through an excitation coil while the detection core extends through a detection coil. The excitation core is disposed on the detection core at right angles. The film has a magnetic path passing therethrough. The magnetic path, the excitation coil, and the detection coil cooperate with each other to provide a magnetic circuit. The excitation coil and the detection coil provides a bridge circuit in cooperation with each other. When a torque is applied to the rotational shaft, the film causes magnetostriction in correspondence to the torque. The magnetostriction is electrically detected by the bridge circuit.

3 Claims, 7 Drawing Sheets

MAGNETOSTRICTIVE TORQUE SENSOR AND ELECTRIC POWER STEERING APPARATUS INCLUDING THE SAME

BACKGROUND OF THE INVENTION

1. Field of the Invention

The present invention relates to a magnetostrictive torque sensor, and an electric power steering apparatus including such a magnetostrictive torque sensor.

2. Description of the Related Art

Magnetostrictive torque sensors are known in the art. The sensors include detection coils for electrically detecting magnetostriction which magnetostrictive rotational shafts, when subjected to torques, cause. Such magnetostrictive torque sensors are disclosed, for example, in Japanese Patent Laid-Open Publication No. HEI 6-221940 entitled "MAGNETOSTRICTIVE TORQUE SENSOR" and Japanese Patent Laid-Open Publication No. HEI 9-166505 entitled "METHOD FOR MANUFACTURING MAGNETOSTRICTIVE TORQUE SENSOR".

A magnatostrictive torque sensor disclosed in the publication No. HEI 6-221940 includes a substantially 8-shaped excitation coil and a substantially 8-shaped detection coil disposed on the excitation coil at right angles thereto. The sensor lies in parallel to an axis of a magnetostrictive torque transmission shaft. When a torque is applied to the shaft, the shaft causes magnetostriction in correspondence to the torque. The sensor electrically detects the magnetostriction.

A magnetostrictive torque sensor disclosed in the publication No. HEI 9-166505 includes first and second magnetic anisotropy portions formed on a rotational shaft. The first and second magnetic anisotropy portions are aligned along a longitudinal direction of the shaft. Each of the first and second portions comprises a plurality of magnetostrictive narrow films. The films can be formed using vapor plating. The films of each of the first and second magnetic anisotropy portions are disposed around a circumference of the rotational shaft. The films of the first magnetic anisotropy portion are spaced at given intervals. Similarly, the films of the second magnetic anisotropy portion are spaced at given intervals. Each film of the first and second magnetic anisotropy portions is inclined relative to the longitudinal direction of the shaft. More specifically, the films of one of the first and second magnetic anisotropy portions are inclined in a clockwise direction while the films of the other are inclined in a counterclockwise direction. The sensor also includes detection coils. The detection coils are designed to electrically detect magnetostriction which the first and second magnetic anisotropy portions, when subjected to a torque, cause.

However, the torque transmission shaft used with the torque sensor disclosed in the publication HEI 6-221940 should be made from material capable of causing magnetostriction. This provides limited freedom to select material from which the torque transmission shaft is made. Also, the rotational shaft is subjected to heat treatment to thereby provide decreased sensitivity of the sensor. Such a sensor of decreased sensitivity should be provided with an amplifier which provides a high gain even in the presence of noise. It is not desirable that the sensor of decreased sensitivity be used with parts of large strength such as a steering shaft.

The sensor disclosed in the publication HEI 9-166505 includes the films disposed on the rotational shaft, as described above. These films should be subjected to masking with increased precision such that they are spaced at the given intervals. It is therefore difficult to produce a number of the rotational shafts having the films formed thereon. Further, the rotational shaft should be made from non-magnetic material, otherwise the sensor would provide an output of small level. Furthermore, since the non-magnetic is relatively expensive, the rotational shaft is costly to make. This results in increased cost of the torque sensor.

SUMMARY OF THE INVENTION

It is an object of the present invention to provide a less costly magnetostrictive torque sensor which has increased mechanical strength and improved durability and which is designed to provide unlimited freedom to select material from which a rotational shaft is made. A further object of the present invention is to provide an electric power steering apparatus including such a magnetostrictive torque sensor and rotational shaft.

According to a first aspect of the present invention, there is provided a magnetostrictive torque sensor comprising: a magnetostrictive film having a predetermined width, the magnetostrictive film being configured to be provided along a circumference of a rotational shaft, the magnetostrictive film having a magnetic path passing therethrough; a substantially U-shaped excitation core disposed in opposed relation to the magnetostrictive film, the excitation core extending through an excitation coil; a substantially U-shaped detection core disposed in opposed relation to the magnetostrictive film, the detection core extending through a detection coil, the detection core being disposed on the excitation core at right angles thereto; a magnetic circuit provided by the magnetic path, the excitation coil, and the detection coil; and a bridge circuit provided by the excitation coil and the detection coil, wherein the magnetostrictive film causes magnetostriction in correspondence to a torque applied to the rotational shaft, and the magnetostriction is electrically detected by the bridge circuit.

The torque sensor includes the magnetostrictive film provided along the circumference of the rotational shaft. That is, the film can be readily provided on the rotational shaft. Thus, the torque sensor is made simple in construction. Although the film is made from expensive material, the film is of small thickness, preferably 1 mm or less in thickness, and hence the material required to form the film can be made small in amount. It thus becomes possible to reduce the cost of the film. Further, since the film is provided along the circumference of the rotational shaft, it can cause magnetostriction to a greater extent. Accordingly, the torque sensor provides improved sensitivity thereof. The torque sensor thus arranged need not include the amplifier as used in the sensor disclosed in the publication HEI 6-221940. Still further, since the film provides skin effect, it is less likely that the film, when causing magnetostriction, is affected by material from which the rotational shaft is made. Moreover, the sensor is of improved sensitivity, and therefore the rotational shaft can be subjected to heat treatment. The thus heat-treated rotational shaft has increased mechanical strength and improved durability. Such a rotational shaft can be used as a steering shaft. The substantially U-shaped excitation core is disposed on the substantially U-shaped detection core at right angles thereto. The cores are disposed in opposed relation to the film. The excitation coil and the detection coil extending through the excitation core and the detection coil, respectively, cooperate with each other to provide the bridge circuit for electrically detecting magnetostriction which the film causes in correspondence to a torque applied to the rotational shaft. The bridge circuit can detect the magnetostriction with increased precision. The excitation core and the detection core have increased strength and improved durability, and thus they can be used with a vehicle steering shaft or the like. Also, since the torque sensor is simple in construction, it becomes possible to manufacture the sensor with ease.

The bridge circuit detects the magnetostriction caused by the film provided on the circumference of the rotational shaft. In other words, the material from which the rotational shaft is made does not affect the detection of the torque applied to the rotational shaft. Therefore, the rotational shaft can be freely designed in such a manner as to provide a reduced cost of the magnetostrictive torque sensor.

According to a second aspect of the present invention, there is provided a magnetostrictive torque sensor comprising: a substantially 8-shaped excitation coil; a substantially 8-shaped detection coil disposed on the excitation coil at right angles thereto; and a magnetostrictive film having a predetermined width, the magnetostrictive film being configured to be provided along a circumference of a rotational shaft, the magnetostrictive film being disposed in opposed relation to the excitation coil and the detection coil, wherein the magnetostrictive film causes magnetostriction in correspondence to a torque applied to the rotational shaft, and the magnetostriction is electrically detected by the detection coil.

The torque sensor includes the magnetostrictive film provided along the circumference of the rotational shaft. That is, the film can be readily provided on the rotational shaft. Thus, the torque sensor is made simple in construction. Although the film is made from expensive material, the film is of small thickness, preferably 1 mm or less in thickness, and hence the material required to form the film can be made small in amount. Thus, it becomes possible to reduce the cost of the film. Further, since the film is provided along the circumference of the rotational shaft, it causes magnetostriction to a greater extent. Accordingly, the torque sensor provides improved sensitivity thereof. The torque sensor thus arranged need not include the amplifier as used in the sensor disclosed in the publication HEI 6-221940. Still further, since the film provides skin effect, it is less likely that the film, when causing magnetostriction, is affected by material from which the rotational shaft is made. Moreover, the sensor is of improved sensitivity, and therefore the rotational shaft can be subjected to heat treatment. The thus heat-treated rotational shaft has increased mechanical strength and improved durability. Such a rotational shaft can be used as a steering shaft. The substantially 8-shaped excitation coil is disposed on the substantially 8-shaped detection coil at right angles thereto. These coils are disposed in opposed relation to the film. This arrangement leads to improved durability of the coils. Accordingly, the excitation coil and the detection coil thus arranged can be used with the steering shaft or the like. Also, since the torque sensor is simple in construction, it is easy to manufacture the sensor.

The excitation coil detects the magnetostriction caused by the film provided on the circumference of the rotational shaft. In other words, the material from which the rotational shaft is made does not affect the detection of the torque applied to the rotational shaft. Therefore, the rotational shaft can be freely designed in such a manner as to provide a reduced cost of the magnetostrictive torque sensor.

According to a third aspect of the present invention, there is provided an electric power steering apparatus comprising: a rotational shaft including a steering wheel; a torque sensor for detecting a steering torque transmitted to the rotational shaft by means of the steering wheel; an electric motor for causing an assisting torque on the basis of the steering torque detected by the torque sensor; and a transmission means for transmitting the assisting torque to the rotational shaft; the torque sensor including: a magnetostrictive film having a predetermined width, the magnetostrictive film being configured to be provided along a circumference of a rotational shaft, the magnetostrictive film having a magnetic path passing therethrough; a substantially U-shaped excitation core disposed in opposed relation to the magnetostrictive film, the excitation core extending through an excitation coil; a substantially U-shaped detection core disposed in opposed relation to the magnetostrictive film, the detection core extending through a detection coil, the detection core being disposed on the excitation core at right angles thereto; a magnetic circuit provided by the magnetic path, the excitation coil, and the detection coil; and a bridge circuit provided by the excitation coil and the detection coil, wherein the magnetostrictive film causes magnetostriction in correspondence to the steering torque applied to the rotational shaft, and the magnetostriction is electrically detected by the bridge circuit.

A rotational shaft used in a conventional electric power steering apparatus is horizontally divided into two shafts. These two shafts are connected to each other through a torsion bar. However, the rotational shaft used in the electric power steering apparatus of the present invention need not include such a torsion bar. Accordingly, the rotational shaft becomes simple in construction.

The rotational shaft is provided with the magnetostrictive film rather than with the torsion bar. The film is provided along the circumference of the shaft. The film causes magnetostriction even in a case where a portion of the shaft having the film provided thereon twists a very small amount in response to the application of the steering torque to the rotational shaft. The magnetostriction is detected by the bridge circuit.

According to a fourth aspect of the present invention, there is provided an electric power steering apparatus comprising: a rotational shaft including a steering wheel; a torque sensor for detecting a steering torque transmitted to the rotational shaft by means of the steering wheel; an electric motor for causing an assisting torque on the basis of the steering torque detected by the torque sensor; and a transmission means for transmitting the assisting torque to the rotational shaft; the torque sensor including: a substantially 8-shaped excitation coil; a substantially 8-shaped detection coil disposed on the excitation coil at right angles thereto; and a magnetostrictive film having a predetermined width, the magnetostrictive film being configured to be provided along a circumference of a rotational shaft, the magnetostrictive film being disposed in opposed relation to the excitation coil and the detection coil; wherein the magnetostrictive film causes magnetostriction in correspondence to the steering torque applied to the rotational shaft, and the magnetostriction is electrically detected by the detection coil.

A rotational shaft used in a conventional electric steering apparatus is horizontally divided into two shafts. These two shafts are connected to each other through a torsion bar. However, the rotational shaft used in the electric power steering apparatus of the present invention need not include such a torsion bar. Accordingly, the rotational shaft becomes simple in construction.

The rotational shaft is provided with the magnetostrictive film rather than with the torsion bar. The film is provided along the circumference of the shaft. The film causes magnetostriction even in a case where a portion of the shaft having the film provided thereon twists a very small amount in response to the application of the steering torque to the rotational shaft. The magnetostriction is detected by the detection coil.

BRIEF DESCRIPTION OF THE DRAWINGS

Certain preferred embodiments of the present invention will hereinafter be described in detail, by way of example only, with reference to the accompanying drawings, in which.

DETAILED DESCRIPTION OF THE PREFERRED EMBODIMENT

The following description is merely exemplary in nature and is in no way intended to limit the invention or its application or uses.

Figure 1A:
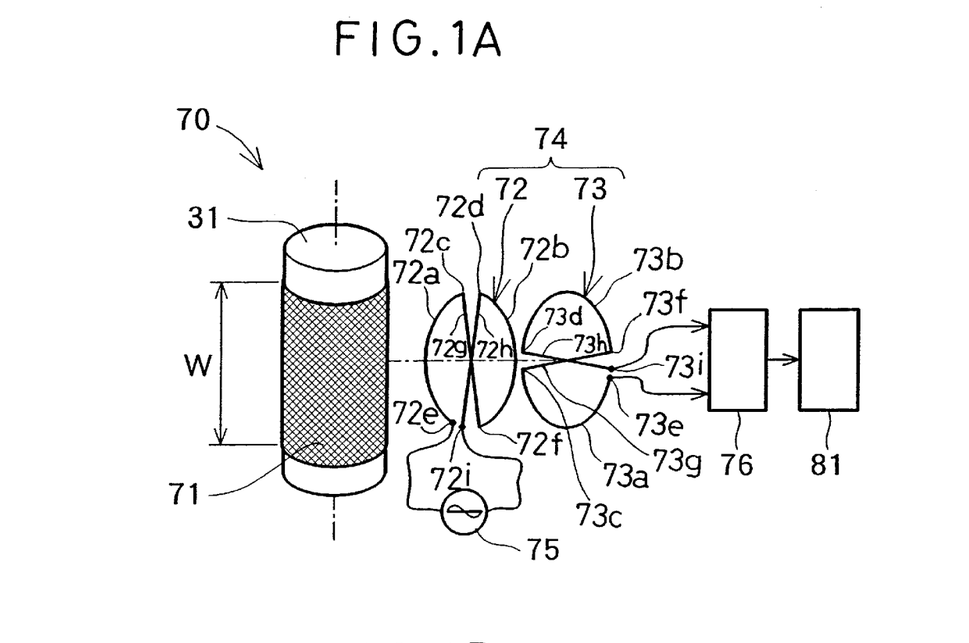
FIG. 1A shows a magnetostrictive torque sensor according to a first embodiment of the present invention.

Referring to FIG. 1A, a magnetostrictive torque sensor 70 includes a magnetostrictive film 71 provided along a circumference of a rotational shaft 31, an excitation coil 72 of substantially 8-shaped configuration, and a detection coil 73 of substantially 8-shaped configuration. The excitation coil 72 is directed perpendicularly to the detection coil 73. The film 71 has a predetermined width W. The film 71 is disposed to cause magnetostriction when a torque is applied to the rotational shaft 31.

The excitation coil 72 has substantially the same size as the detection coil 73. The coil 73 is disposed on the coil 72 in substantially concentric relation thereto for use in detecting the torque applied to the rotational shaft in the manner as described later. The coils 72, 73 thus arranged cooperate with each other to provide a magnetic head 74. The magnetic head 74 is disposed in close proximity to the film 71. More specifically, the magnetic head 74 is spaced from the film 71 by a small gap (e.g., in the order of 0.4 to 0.6 mm). The coils 72, 73 are disposed in opposed relation to the film 71. More specifically, these coils 72, 73 and the film 71 are aligned in a direction perpendicular to the rotational shaft 31. The rotational shaft 31 is formed from, for example, chromium molybdenum steels (JIS-G-4105; SCM) containing little or no nickel.

The film 71 greatly varies in magnetic flux density when deformed or distorted. The film 71 may be made from Ni—Fe—based alloy. Vapor plating can be used to form the film 71 on the circumference of the shaft 31. The thickness of the film 71 is in the order of 5 $\mu$m.

It is preferred that the film 71 contain about 20% or 50% by weight of Ni to provide a large magnetostriction constant thereof. For example, the film 71 contains 50% to 60% by weight of Ni and the remaining proportion of Fe. The film 71 may be formed of ferromagnetic material such as permalloy (containing about 78% by weight of Ni and the remaining proportion of Fe) or supermalloy (containing 78% by weight of Ni, 5% by weight of Mo, and the remaining proportion of Fe).

The film 71 may be stuck on the circumferential surface of the rotational shaft 31 in such a manner as to cause magnetostriction when a torque is applied to the shaft 31.

The coils 72, 73 of the sensor 70 are known from Japanese Laid-Open Publication HEI 6-221940 "MAGNETOSTRICTIVE TORQUE SENSOR".

As disclosed in the above publication, the coil 72 has one loop including two curved lines 72a, 72b and two straight lines 72g, 72h. The line 72a has ends 72c, 72e provided in opposed relation to ends 72d, 72f of the line 72b, respectively. The line 72g extends between the ends 72c, 72f. The line 72h and the line 72b has the end 72d in common. The line 72h has one end 72i provided closely to the end 72e. As can be seen from this figure, the coil 73 has the same construction as the coil 72, and hence its description is omitted.

The straight lines 72g, 72h of the excitation coil 72 are positioned substantially parallel to an axis of the shaft 31. The ends 72e 72i, 73e, 73i serve as terminals of the coils 72, 73, respectively. Connected to the terminals 72e, 72i is a power supply 75 for providing excitation current to the coil 72. The terminals 73e, 73i are connected to an amplifier 76 for amplifying an output voltage appearing between the terminals 73e, 73i.

When a torque is applied to the rotational shaft 31 having the film 71 formed thereon, the film 71 causes magnetostriction. The detection coil 73 electrically detects the magnetostriction.

More specifically, when a torque is applied to the rotational shaft 31 while an alternating voltage (an exciting voltage) of high frequency of the order of 20 to 100 kHz is supplied from the power supply 75 to the excitation coil 72, the film 71 causes magnetostriction. An alternating voltage (an output voltage) having the same frequency as the exciting voltage then appears between the terminals 73e, 73i of the detection coil 73 in correspondence to the torque.

It depends on the direction of application of the torque whether the output voltage and the exciting voltage are in phase or out of phase with each other by half a cycle, for example, 180 degrees. The output voltage has its amplitude proportional to magnitude of the torque applied to the shaft 31. The output voltage is rectified in synchronization with the excitation voltage. Accordingly, it becomes possible to detect both the magnitude of the torque and direction of the application of the torque.

The output voltage is amplified in the amplifier 76. The amplifier 76 then produces a signal on the basis of the amplified output voltage and then supplies such a signal to a control means 81.

If the rotational shaft 31 is insufficiently magnetized, both the excitation coil 72 and the detection coil 73 may have an increased number of loops. In this case, the excitation coil 72 and detection coil 73 are disposed one over the other such that the provision of the loop of the excitation coil 72 alternates with the provision of the loop of the detection coil 73.

Figure 1B:
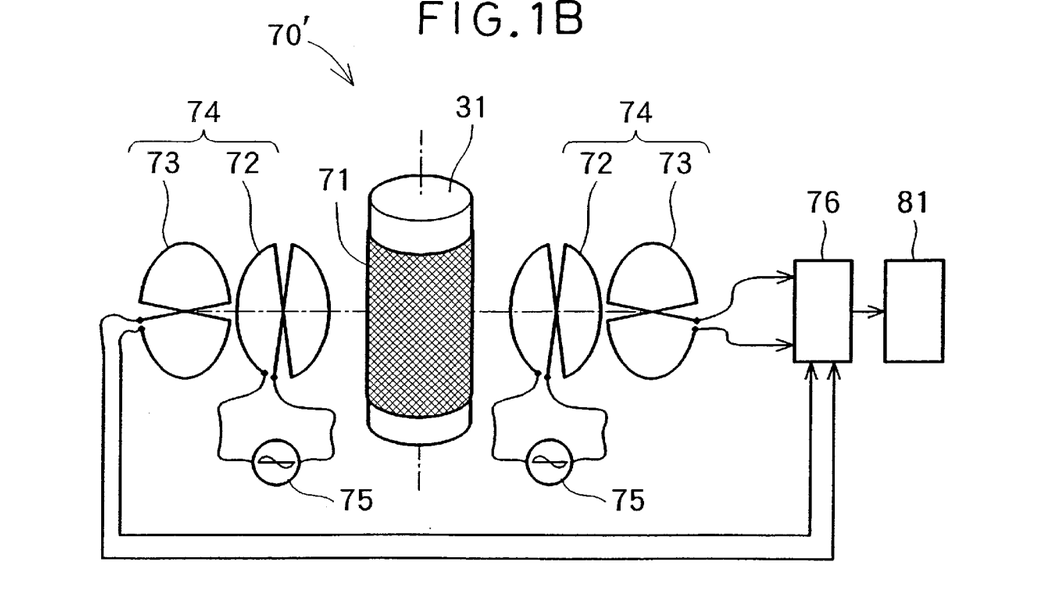
FIG. 1B shows an alternative to the torque sensor shown in FIG. 1A.

Reference is made to FIG. 1B. There is shown an alternative to the torque sensor 70. A sensor 70' comprises the magnetostrictive film 71 and the two magnetic heads 74, 74. Each magnetic head 74 includes the excitation coil 72 and the detection coil 74 disposed in the manner as discussed with reference to FIG. 1A. The two magnetic heads 74, 74 are provided in symmetric relation to each other. The excitation coils 72, 72 are disposed in opposed relation to the film 71. The axis of the rotational shaft 31 is positioned midway between the coils 72, 72 of the magnetic heads 74, 74. The amplifier 76 amplifies a voltage equal to the difference between voltages output from the detection coils 73, 73. The amplifier 76 then produces a signal on the basis of the amplified voltage and supplies the control means 81 with such a signal. The signal supplied from the amplifier 76 is substantially not affected by the change in ambient temperature or a gap formed between the film 71 and the detection coil 73.

The rotational shaft would be required to undergo masking if plural narrow magnetostrictive films were precisely provided on the shaft, as disclosed in the publication No. HEI 9-166505. Subjecting the rotational shaft to masking undesirably requires expensive equipment.

A conventional electric power steering apparatus has also employed a rotational shaft for transmitting to a rack and pinion mechanism a steering torque caused when a steering wheel is turned. Such a rotational shaft is horizontally divided into two shafts. These two shafts are connected by means of a torsion bar. When the torsion bar twists an amount, a torque sensor used in the electric power steering apparatus detects the amount of twisting of the torsion bar. The torque sensor 70 of the present invention, however, detects magnetostriction caused by the magnetostrictive film 71 provided on the rotational shaft 31, as discussed with reference to FIG. 1A. It thus becomes possible to eliminate the need to horizontally divide the rotational shaft 31.

The torque sensors 70, 70' shown in FIG. 1A and FIG. 1B, however, include the film 71 provided in such a manner as to extend around the circumference of the rotational shaft 31. With this arrangement, it is not necessary for the film 71 to be precisely provided on the shaft, as disclosed in the above publication. In other words, the film 71 can be readily provided on the rotational shaft 31. The cost for providing the film 71 on the shaft 31 can thus be greatly reduced. Further, since the rotational shaft 31 can be formed of any material, it can be more freely designed.

Discussion will be made as to a vehicle steering system 10 including an electric power steering apparatus 30 in accordance with the present invention.

Figure 2:
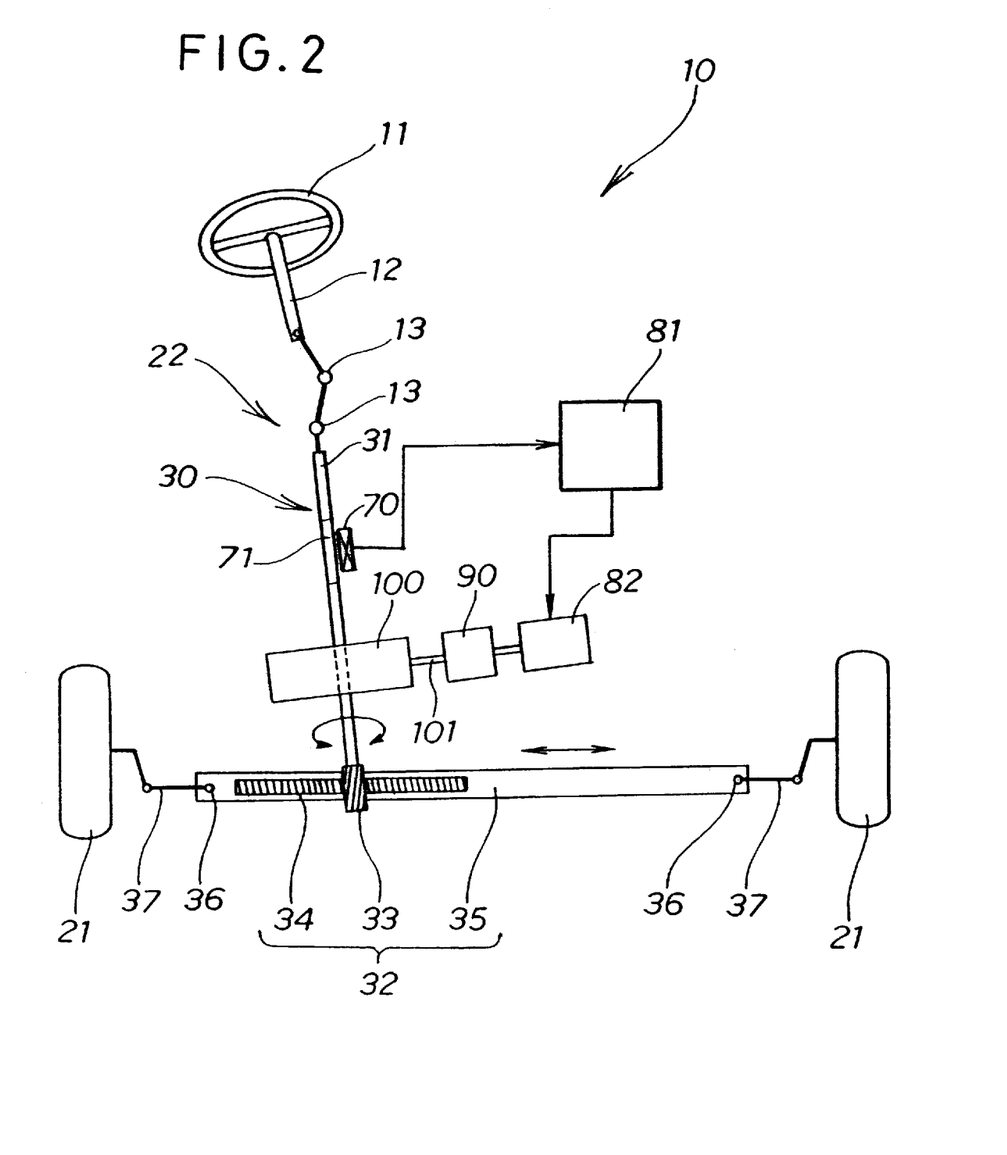
FIG. 2 shows a vehicular steering system comprising an electric power steering apparatus including the torque sensor according to the present invention.

As shown in FIG. 2, a vehicle steering system 10 comprises a steering system 22. The steering system 22 is provided with the electric power steering apparatus 30. The electric power steering apparatus 30 includes the rotational shaft 31 and the torque sensor 70 as stated in relation to FIG. 1A.

A steering wheel 11 is connected to a steering shaft 12. The steering shaft 12 is connected via universal joints 13, 13 to the rotational shaft 31 of the electric power steering apparatus 30. The shaft 31 is connected to a rack and pinion mechanism 32. The rack and pinion mechanism 32 has opposite ends connected through right and left tie rods 37, 37 to right and left wheels 21, 21.

The rack and pinion mechanism 32 includes a pinion 33 provided on the shaft 31, and a rack shaft 35 having a rack 34 formed thereon. The rack 34 engages with the pinion 33.

When a driver turns the steering wheel 11, a steering torque is caused. The steering torque is transmitted to the shaft 31 and the rack and pinion mechanism 32. The transmission of the steering torque to the rack and pinion mechanism 32 causes the tie rods 37, 37 to turn the right and left wheels 21, 21.

The steering torque caused when the steering wheel is turned is detected by the torque sensor 70 in the manner as described with reference to FIG. 1A. The sensor 70 produces a signal indicative of the detection of the steering torque and then supplies such a signal to the control means 81. The control means 81 subsequently produces a control signal on the basis of the signal supplied from the sensor 70. On the basis of the control signal, an electric motor 82 causes an assisting torque corresponding to the steering torque. The assisting torque is transmitted through a torque limiter 90, a reduction gear 100, and the rotational shaft 31 to the rack and pinion mechanism 32. The assisting torque assists the tie rods 37, 37 in turning the wheels 21, 21. Therefore, the steering torque caused when the driver turns the steering wheel 11, and the assisting torque caused by the electric motor 82 cooperate with each other to turn the steered wheels 21, 21.

Figure 3:
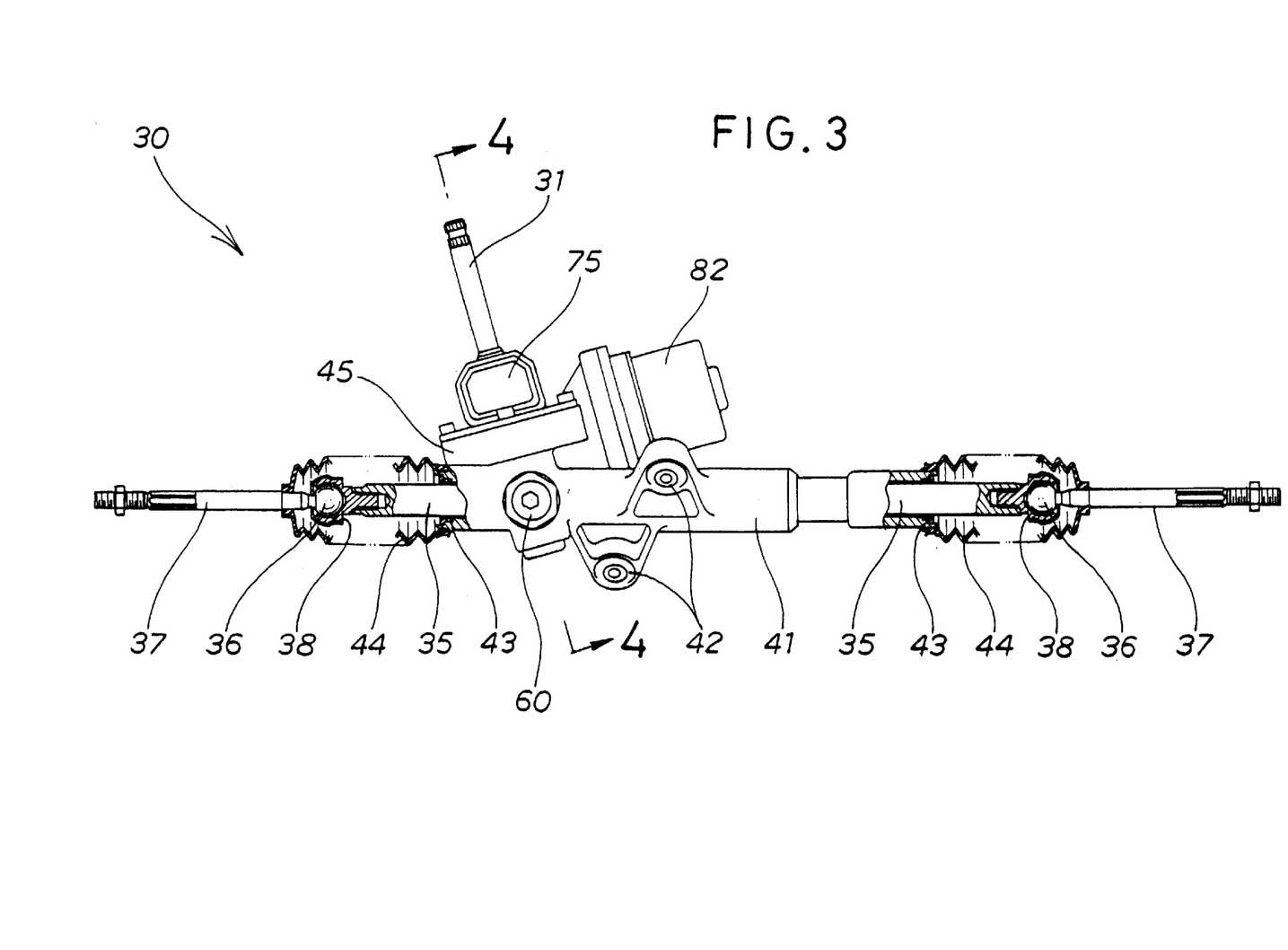
FIG. 3 shows partly in cross-section the electric power steering apparatus according to the present invention.

Shown in FIG. 3 is the construction of the electric power steering apparatus 30. The rack shaft 35 of the apparatus 30 is slidably accommodated within a housing 41 extending longitudinally of the rack shaft 35.

The rack shaft 35 has its opposite end portions projecting out of the housing 41. The opposite end portions have ball joints 36, 36 coupled thereto. The ball joints 36, 36 have the tie rods 37, 37 connected thereto. The housing 41 includes brackets 42, 42 for use in attaching the apparatus 30 to a vehicle body (not shown). The housing 41 has right and left stoppers 43, 43 mounted on right and left end portions thereof, respectively.

When the rack shaft 35 is rightwardly slid a given amount, a left rack end 38 disposed in contact with the ball joint 36 comes into abutment against the left stopper 43. Similarly, when the rack shaft 35 is leftwardly slid a given amount, a right rack end 38 disposed in contact with the ball joint 36 comes into abutment against the right stopper 43. The stoppers 43, 43 thus arranged limit the amount of sliding of the rack shaft 35. This allows the wheels 21, 21 to be turned a limited amount. When the rack shaft 35 abuts against the stopper 43, the wheels 21, 21 are turned a maximum amount. Reference numerals 44, 44 denote boots.

Figure 4:
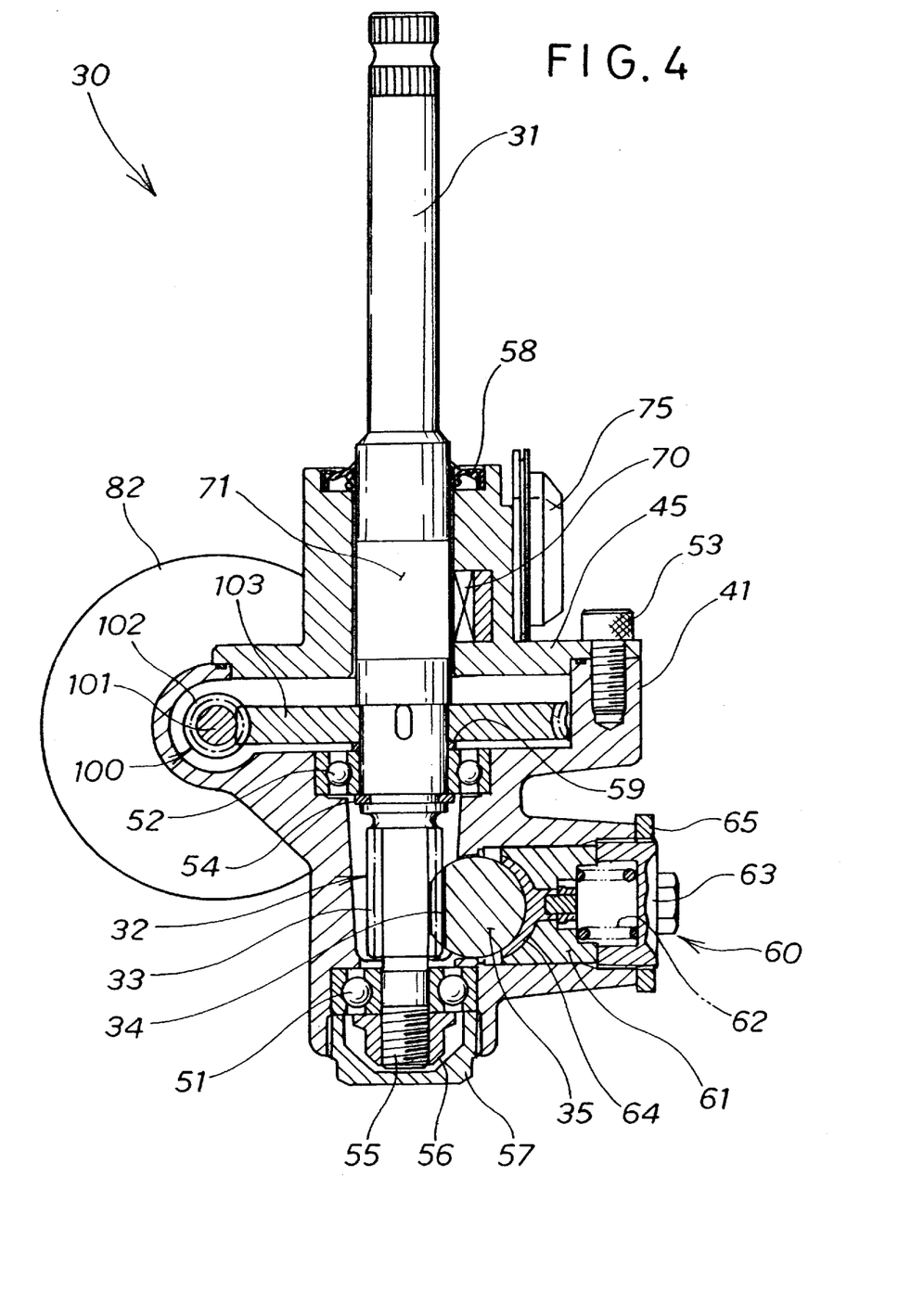
FIG. 4 is a cross-sectional view taken along line 4—4 of FIG. 3.

Turning to FIG. 4, the electric power steering apparatus 30 includes the housing 41 which accommodates therein the shaft 31, the rack and pinion mechanism 32, the torque sensor 70, the electric motor 82, the torque limiter 90 (see FIG. 2), and the reduction gear 100. The housing 41 has an opening formed at an upper part thereof. Such an opening is closed by a lid 45. The sensor 70 is mounted to the lid 45 in the illustrated embodiment, however, it may be attached to the housing 41.

Upper and lower bearings 51, 52 are provided between the housing 41 and the shaft 31. The rotational shaft 31 has a longitudinally central portion and a lower end portion thereof rotatably supported by the upper and lower bearings 51, 52, respectively. The housing 41 is provided with a rack guide 60. Designated by reference numeral 53 is a bolt for mounting the lid 45 to the housing 41. Reference numeral 54 denotes a retaining ring.

The rotational shaft 31 has the pinion 33 mounted integrally with a lower part thereof. The pinion 33 has a threaded portion 55 formed on the lower end portion thereof. The shaft 31 has an upper part projecting upwardly from the lid 45. The shaft 31 acts as a shaft of the pinion 33. The threaded portion 55 is screwed into a nut 56. With this arrangement, it becomes possible to limit the amount of the axial movement of the rotational shaft 31. Reference numerals 57, 58, 59 denote a box nut, an oil seal, and a spacer.

The rack guide 60 includes a guide portion 61 positioned oppositely from the rack 34, and an adjusting bolt 63 screwed into the housing 41. The guide portion 61 abuts on the rack shaft 35. The adjusting bolt 63 pushes the guide portion 61 by means of a compression spring 62. More specifically, since the bolt 63 appropriately pushes the guide portion 61 with the spring 62, the guide portion 61 applies a pre-load to the rack 34. The rack 34 thus arranged is pressed against the pinion 33. The rack shaft 35 has its back surface slidably abutting on an abutment member 64. Reference numeral 65 is a lock nut.

The reduction gear 100 comprises a worm gear for transmitting to the rotational shaft 31 the assisting torque caused by the electric motor 82. More specifically, the reduction gear 100 includes a transmission shaft 101 connected through the torque limiter 90 (see FIG. 2) to the electric motor 82, a worm 102 formed on the shaft 101, and a worm wheel 103 engaging with the worm 102. The worm wheel 103 is coupled to the rotational shaft 31. With the thus arranged reduction gear 100, the assisting torque caused by the electric motor 82 can be transmitted through the rotational shaft 31 to the rack and pinion mechanism 32.

A conventional electric power steering apparatus has also employed a rotational shaft for transmitting to a rack and pinion mechanism a steering torque caused when a steering wheel is turned. Such a rotational shaft is horizontally divided into two shafts. These two shafts are connected by means of a torsion bar. When the torsion bar twists an amount, a torque sensor used in the electric power steering apparatus detects the amount of twisting of the torsion bar. The torque sensor 70 of the present invention, however, detects magnetostriction caused by the magnetostrictive film 71 provided on the rotational shaft 31, as discussed with reference to FIG. 1A. It thus becomes possible to eliminates the need to horizontally divide the rotational shaft 31.

The electric motor causes a moment of inertia. The moment of inertia and spring modulus of the torsion bar cooperate with each other to provide a resonance point expressed by the following equation (1):

$$\text{resonance point} = \sqrt{\frac{k}{I}} \quad (1)$$

where the spring modulus is k and the moment of inertia is I.

As is apparent from the foregoing description, the rotational shaft 31 used in the electric power steering apparatus 30 of the present invention does not include the torsion bar. This arrangement provides a large spring modulus k. Since the spring modulus k is large, the resonance point can also be made large.

For the conventional electric power steering apparatus employing the rotational shaft including the torsion bar, a little time is inevitably required to bring the electric motor out of operation after a steering wheel ceases to be turned. Therefore, the moment of inertia I caused by the electric motor is undesirably transmitted to the steering wheel notwithstanding the steering wheel is not turned. However, the rotational shaft used in the electric power steering apparatus of the present invention does not include the torsion bar, as stated above. This arrangement allows the motor to become out of operation as soon as the steering wheel 11 ceases to be turned. The moment of inertia I to be transmitted to the steering wheel after the steering wheel 11 ceases to be turned is therefore reduced.

Even in a case where a portion of the shaft having the film provided thereon twists a very small amount in response to the application of the steering torque to the rotational shaft 31, the film 71 causes magnetostriction. The magnetostriction is electrically detected by the detection coil 73 of the steering torque 70. As a result, the steering torque can be rapidly detected. Thus, the electric power steering apparatus 30 of the vehicle steering system 10 rapidly causes the assisting torque corresponding to the steering torque. Consequently, the driver can smoothly turn the steering wheel 11.

As described above, the film 71 of width W extends around the circumference of the rotational shaft 31. The film 71 causes the magnetostriction when subjected to the steering torque. The magnetostriction is detected by the detection coil 73 of the torque sensor 70. Therefore, unlike the torque transmission shaft as disclosed in the publication HEI 6-221940, the rotational shaft 31 can be formed of any material. For example, the shaft 31 may be formed from a material of increased mechanical strength.

Because the rotational shaft 31 can be made from the material of increased mechanical strength, the pinion 33 can also be made from the material of increased strength. As a result, the pinion 33 and the rack 34 can firmly or steadily engage with each other. With this arrangement, the pinion 33 can transmit to the rack 34 a large assisting torque caused by the electric motor 82. It will be appreciated that the electric power steering apparatus 30 includes the rack and pinion mechanism 32 having a durability sufficient to undergo a torque caused on the basis of inertia of the electric motor 82.

Further, since there is no need to divide the rotational shaft 31 into the two shafts, the rotational shaft 31 can be made simple in construction. The length of the rotational shaft 31 can also be made large. The rotational shaft 31 of large length can be readily set on a machine for providing the shaft 31 with the pinion 33. Therefore, it becomes possible to precisely provide the shaft 31 with the pinion 33. The thus formed pinion 33 precisely engages with the rack 34. Consequently, the rack and pinion mechanism 32 can effect the transmission of the torque with increased efficiency.

Discussion will be made next as to a magnetostrictive torque sensor according to a second embodiment of the present invention. Parts identical to those previously described with reference to FIG. 1 to FIG. 4 are denoted by the same reference numerals, and their descriptions will be omitted.

Figure 5:
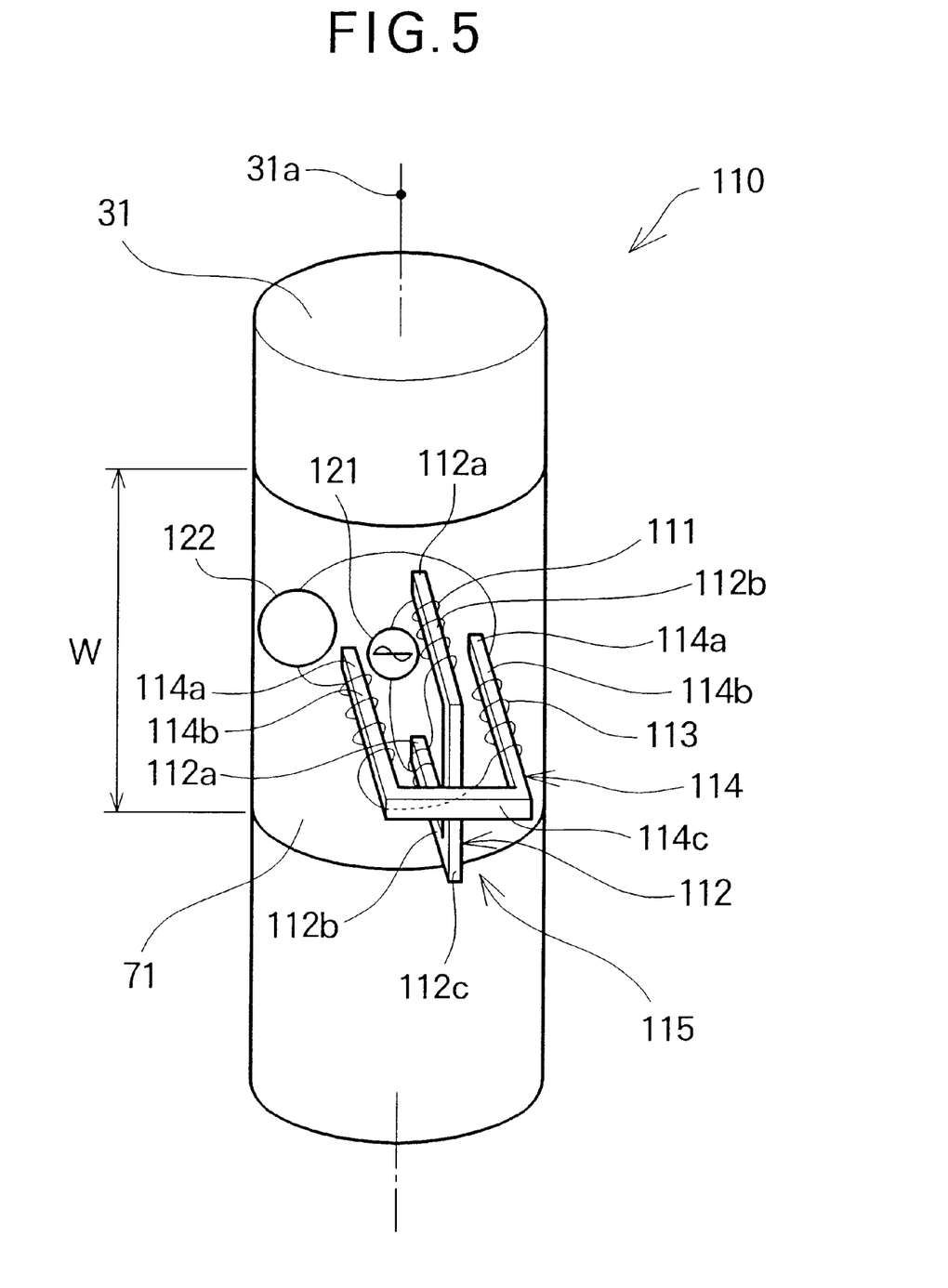
FIG. 5 shows a magnetostrictive torque sensor according to a second embodiment of the present invention.

Reference is made to FIG. 5. A magnetostrictive torque sensor 110 includes the magnetostrictive film 71 provided along a circumference of the rotational shaft 31, a substantially U-shaped excitation core 112, and a substantially U-shaped detection core 114. The core 112 extends through an excitation coil 111 while the core 114 extends through a detection coil 113. The film 71 has the predetermined width W. The film 71 causes magnetostriction when a torque is applied to the rotational shaft 31. The cores 112, 114 are disposed in opposed relation to the film 71. The core 112 includes leg portions 112b, 112b having end portions 112a, 112a, and a bottom portion 112c formed integrally with the leg portions 112b, 112b. Similarly, the core 114 includes leg portions 114b, 114b having end portions 114a, 114a, and a bottom portion 114c formed integrally with the leg portions 114b, 114b. The core 112 is disposed on the core 114 with the bottom portion 112c provided perpendicularly to the bottom portion 114c. The leg portions 112b, 112b are disposed in parallel to the leg portions 114b, 114b. The film 71 has a magnetic path passing therethrough. The magnetic path, the excitation coil 111, and the detection coil 113 cooperate with each other to provide a magnetic circuit.

The cores 112, 114 and the coils 111, 113 are well known, as disclosed on page 123, Sensor Handbook, published by Baifuhkan, on May 30, 1986.

The core 112 and the core 114 cooperate with each other to provide a cross-shaped configuration when viewed in front elevation. The end portions 112a, 112a of the core 112 and the end portions 114a, 114a of the core 114 face towards an axial line 31a of the shaft 31. Between the end portions 112a, 112a, 114a, 114a and the film 71, there is provided a small gap (e.g. in the order of 0.4 through 0.6 mm). In the illustrated embodiment, the end portions 112a, 112a of the core 112 are aligned in parallel to the axial line 31a.

The core 112 and the core 114 form a magnetic head 115 in cooperation with each other. The excitation coil 111 is connected at opposite ends thereof to a power supply 121 for providing excitation current thereto. The detection coil 113 is connected at opposite ends thereof to an amplifier 122 for amplifying a voltage appearing between the opposite ends of the coil 113.

The width W of the film 71 is greater than the length of each of the bottom portions 112c, 114c of the cores 112, 114.

Figure 6:
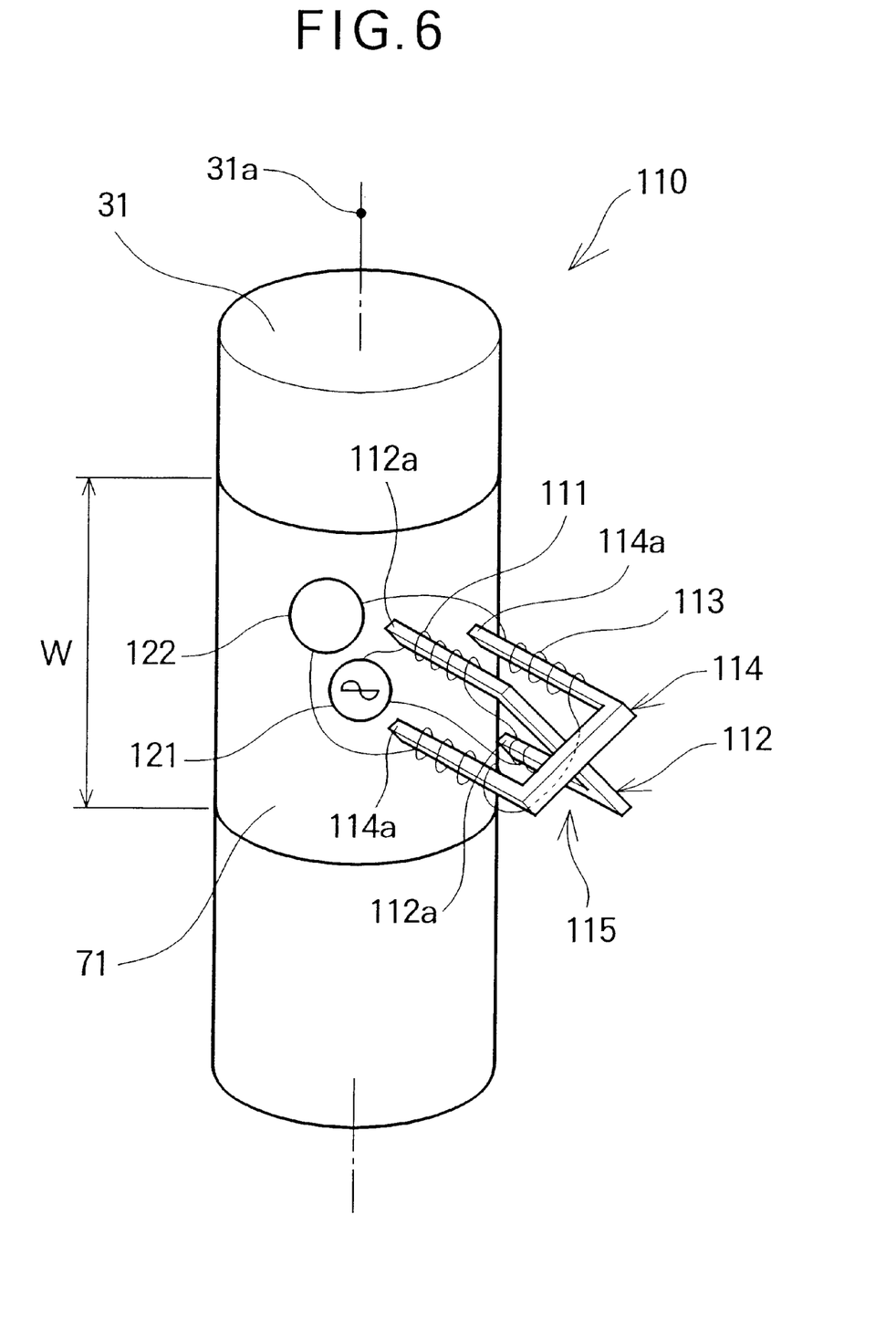
FIG. 6 shows the magnetostrictive torque sensor of FIG. 5 inclined.

The torque sensor 110 may be disposed with the leg portions 112b, 112b, 114b, 114b inclined 45 degrees away from the axial line 31a, as shown in FIG. 6.

Figure 7:
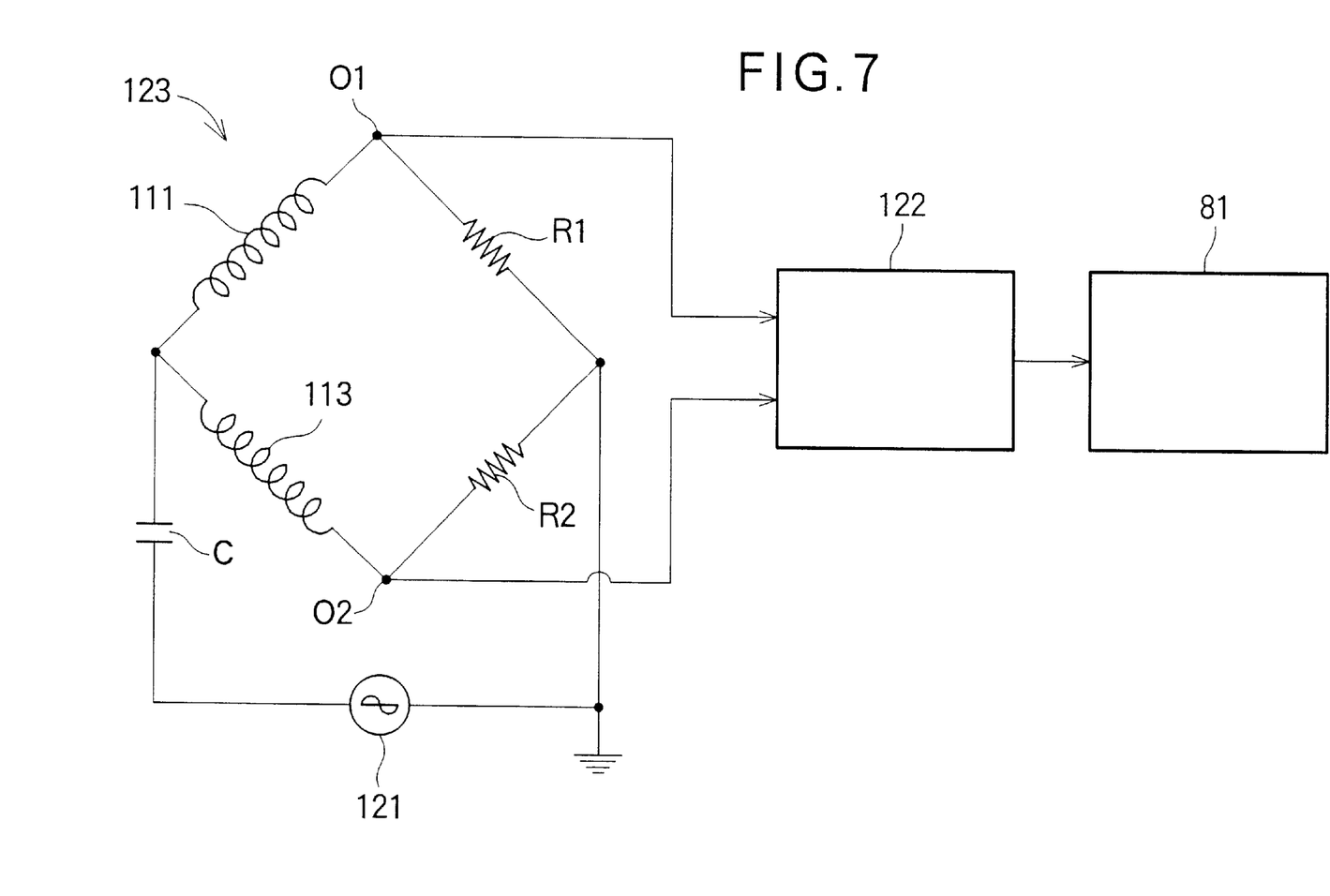
FIG. 7 is a view illustrating an equivalent circuit of a circuit comprised of an excitation coil and a detection coil of the torque sensor as shown in FIG. 5.

As shown in FIG. 7, there is provided an equivalent circuit 123 of a circuit comprised of the excitation coil 111 and the detection coil 113 of the sensor 110.

The equivalent circuit 123 takes the form of a bridge circuit. The bridge circuit 123 is comprised of the excitation coil 111, the detection coil 113, and two resistors R1, R2. The circuit 123 serves as both an excitation means forming one part of the magnetic circuit including the film 71 and a detection means for detecting magnetostriction caused by the film 71. Reference character C denotes a capacitor.

When a torque is applied to the rotational shaft 31 having the film 71 provided thereon, the film 71 causes magnetostriction in correspondence to the torque. The magnetostriction is electrically detected by the circuit 123 shown in FIG. 7.

More specifically, when the film 71 causes the magnetostriction in the above manner with the power supply 121 supplying an excitation current to the excitation coil 111, a voltage at an output point O1 becomes unequal to a voltage at an output point O2. Consequently, an output voltage equal to a difference between the voltages at the points O1, O2 appears between the output points O1, O2. The output voltage is then amplified in the amplifier 122. The amplifier 122 produces a signal on the basis of the amplified output voltage, and then supplies such a signal to the control means 81.

The torque sensor 110 described in relation to FIG. 5 to FIG. 7 includes the film 71 provided on the circumferential surface of the rotational shaft 31, as does the torque sensor 70 shown in FIG. 1A. This means that it becomes unnecessary to precisely provide the shaft 31 with the films as disclosed in the publication No. HEI 9-166505. Thus, the film 71 can be easily provided on the shaft 31. This results in decreased cost for providing the shaft 31 with the film 71. Further, the rotational shaft 31 may be formed from any material, whereby the shaft 31 can be more freely designed. The torque sensor 110 can be employed in the electric power steering apparatus 30 illustrated in FIG. 2, as is the torque sensor 70 shown in FIG. 1A. It will be understood that the torque sensor 110, when used in the electric power steering apparatus 30, provides the same advantage as the sensor 70.

The torque sensors 70, 110 have been described as being employed in the electric power steering apparatus 30, they may be applicable to a variety of apparatuses.

Obviously, various minor changes and modifications of the present invention are possible in the light of the above teaching. It is therefore to be understood that within the scope of the appended claims, the present invention may be practiced otherwise than as specifically described.

What is claimed is:

1. An electric power steering apparatus comprising:

a one-piece, cylindrical, rotational shaft operationally connected to a steering wheel;

a torque sensor for detecting a steering torque transmitted to said rotational shaft by means of the steering wheel;

an electric motor for causing an assisting torque on the basis of the steering torque detected by the torque sensor; and a transmission means for transmitting the assisting torque to said rotational shaft;

said torque sensor including:
 a magnetostrictive film having a predetermined width, said magnetostrictive film being configured to be provided along a circumference of a portion of the rotational shaft, said magnetostrictive film having a magnetic path passing therethrough;
 a substantially U-shaped excitation core disposed in opposed relation to said magnetostrictive film, said excitation core extending through an excitation coil;
 a substantially U-shaped detection core disposed in opposed relation to said magnetostrictive film, said detection core extending through a detection coil, said detection core being disposed on said excitation core at right angles thereto;
 a magnetic circuit provided by said magnetic path, said excitation coil, and said detection coil; and
 a bridge circuit provided by said excitation coil and said detection coil,
 wherein said magnetostrictive film causes magnetostriction in correspondence to the steering torque applied to the rotational shaft, and the magnetostriction is electrically detected by said bridge circuit.

2. An electric power steering apparatus comprising:

a one-piece, cylindrical rotational shaft operationally connected to a steering wheel;

a torque sensor for detecting a steering torque transmitted to said rotational shaft by means of the steering wheel;

an electric motor for causing an assisting torque on the basis of the steering torque detected by said torque sensor; and a transmission means for transmitting the assisting torque to said rotational shaft;

said torque sensor including:
 a substantially 8-shaped excitation coil;
 a substantially 8-shaped detection coil disposed on said excitation coil at right angles thereto; and
 a magnetostrictive film having a predetermined width, said magnetostrictive film being configured to be provided along a circumference of a portion of the rotational shaft, said magnetostrictive film being disposed in opposed relation to said excitation coil and said detection coil;
 wherein said magnetostrictive film causes magnetostriction in correspondence to the steering torque applied to the rotational shaft, and the magnetostriction is electrically detected by said detection coil.

3. The electric power steering apparatus of claim 1, wherein said rotational shaft has an axis, the cores of said torque sensor has leg portions, and the leg portions are inclined 45 degrees away from the rotational shaft axis.

* * * * *